(12) United States Patent
Balk

(10) Patent No.: US 6,336,551 B1
(45) Date of Patent: Jan. 8, 2002

(54) CONVEYOR

(76) Inventor: Wouter Balk, Prof. Tulpstraat 17, Amsterdam (NL), 1018 GZ (*) Notice: Subject to any disclaimer, the term of this patent is extended or adjusted under 35 U.S.C. 154(b) by 0 days.

(21) Appl. No.: 09/145,019

(22) Filed: Sep. 1, 1998

(30) Foreign Application Priority Data

Sep. 2, 1997 (NL) ............................................. 1006909

(51) Int. Cl.$^7$ ................................................ B65G 17/06
(52) U.S. Cl. ........................ 198/852; 198/845; 198/778
(58) Field of Search ................................. 198/852, 778, 198/845, 838, 831; 193/355

(56) References Cited

U.S. PATENT DOCUMENTS

| | | | | |
|---|---|---|---|---|
| 2,298,386 A | * | 10/1942 | Jennings | 198/189 |
| 3,627,109 A | * | 12/1971 | Cabak | 198/137 |
| 3,651,924 A | * | 3/1972 | Homeier et al. | 198/189 |
| 3,788,447 A | * | 1/1974 | Stephanoff | 198/41 |
| 3,826,352 A | | 7/1974 | Van Zon et al. | |
| 3,944,059 A | | 3/1976 | Garvey | |
| 3,951,256 A | * | 4/1976 | Gurewitz | 198/182 |
| 4,164,283 A | * | 8/1979 | Flajnik | 198/840 |
| 4,770,291 A | | 9/1988 | Shaw | |
| 4,867,301 A | * | 9/1989 | Roinestad et al. | 198/852 |
| 5,176,247 A | * | 1/1993 | Counter et al. | 198/831 |
| 5,224,587 A | * | 7/1993 | Robertson | 198/831 |
| 5,291,987 A | * | 3/1994 | Zink | 198/724 |
| 5,586,644 A | * | 12/1996 | Coen et al. | 198/853 |
| 5,775,480 A | * | 7/1998 | Lapeyre et al. | 198/831 |

FOREIGN PATENT DOCUMENTS

| | | |
|---|---|---|
| DE | 39 14994 | 11/1990 |
| GB | 1463226 | 2/1977 |

* cited by examiner

Primary Examiner—Christopher P. Ellis
Assistant Examiner—Rashmi Sharma
(74) Attorney, Agent, or Firm—Wenderoth, Lind & Ponack, L.L.P.

(57) ABSTRACT

A conveyor for conveying piece goods and the like through a helical path in a vertical direction has a frame and an endless conveyor belt supported by the frame having a conveying part guided in the helical path and a return path. The conveyor belt includes substantially rigid slats movably coupled near their axis and having an upper transport face. The slats are relatively pivotable around both of two axes. The frame has a helical support face for slidably supporting the slats in the conveying part and a radially directed guide face for guiding these slats substantially radially in the conveying part. At least a number of slats are provided with at least a guide roller rotatable about a substantially vertical axis of rotation and adapted to roll along the radially directed guide face.

8 Claims, 4 Drawing Sheets

CONVEYOR

BACKGROUND OF THE INVENTION

1. Field of the Invention

The present invention relates to a conveyor for conveying piece goods and the like through a helical path in an upright direction, comprising a frame, an endless conveyor belt supported by the frame and driven by driving means and having a conveying part guided in the helical path and a return path. The conveyor belt includes substantially rigid slats movably coupled near their axis and has an upper transport face, the slats being relatively pivotable both around a first axis parallel to the transport face and perpendicularly to the conveying direction and around a second axis perpendicularly to the transport face and perpendicularly to the conveying direction, the frame comprises a helical support face for slidably supporting the slats in the conveying part, and the frame further comprises a radially directed guide face for guiding these slats substantially radially in the conveying part.

2. Description of the Related Art

Such conveyors are known from practice in various embodiments. For bridging a relatively large height without an overly large pitch of the windings of the helix, it is necessary to use a great number of windings This causes drive problems, however, since the pull forces necessary for moving the belt increase exponentially with the increase of the arc of the belt around the axis of the helix. The resistance experienced by the slat in the conveying direction is, first of all, the result of the frictional forces between the slat and the support face. Secondly, the resistance is caused by the frictional force created by the force with which the slat is urged against the radially directed guide face. This latter force increases exponentially with the length of the arc and thus with the number of windings, and this is the so-called "noose effect" in which the belt is jamming when driven in a pulling fashion.

In practice this problem has tried to be solved by building in auxiliary drives in several positions along the helix. Of course, this results in a substantial increase of the cost price of the conveyor, whereas the reliability and the noise and vibration level are also affected. Another solution for the problem has been sought in using a roller car under each relatively wide slat. These roller cars are equipped with three or four rollers directed radially with respect to a guide tube, the rollers guiding the slats both vertically and horizontally. The disadvantage of this solution is the complexity and the creation of large spaces between the slats at the position of the end pulleys, since the bending center of the conveyor belt (at the point of engagement of the chain) is at a large distance from the transport face of the slats. This makes the conveyor useless for conveying smaller and/or weaker products. It is also impossible to build this prior art conveyor in a compact manner, and the stability of the slats is defective as a result of the roller cars, whereas the chain tension is necessary for the stability.

SUMMARY OF THE INVENTION

The object of the present invention is to provide a conveyor with which the above problems are removed in an effective way.

For this purpose, the conveyor according to the invention is characterized in that at least a number of slats are provided with at least a guide roller rotatable about an axis of rotation parallel to the second axis and adapted to roll along the radially directed guide face.

Due to this feature, the "noose effect" as mentioned before is substantially reduced because the frictional forces against the radially directed guide face are at a much lower level due to the rolling friction instead of sliding friction in the prior art. This enables the conveyor belt to be transported through a great number of windings without really necessitating auxiliary drives. Furthermore, the structure can remain simple since only a roller is used for guiding along the regularly directed guide face, whereas the support of the slats by the support face remains a sliding support. If a chain is used as connecting element between the slats, it may engage closely under the transport face of the slat, resulting in a small distance of the bending center of the conveyor belt under it, which causes hardly any spacings between the slats at the end pulleys.

Due to the simple structure the invention may be combined with narrow slats enabling the use of a compact end pulley, which facilitates the incorporation of the conveyor and creates a better transfer to connecting conveyors. The narrow slats also lead to a smaller spacing at the end pulley, whereas also a smaller spacing is created between the slats when they are pivoted relatively in the helical section. Smaller slats are also less inclined to form steps as a result of the inner inclination being steeper than the outer inclination of the helical path.

If a cylindrical guide roller and a vertical smooth guide face are used, no axial loads and no force increases due to resolved forces in the axial direction are created.

The invention will hereafter be further explained with reference to the drawings, showing embodiments of the conveyor according to the invention by way of example.

DESCRIPTION OF THE PREFERRED EMBODIMENTS

Figure 2:
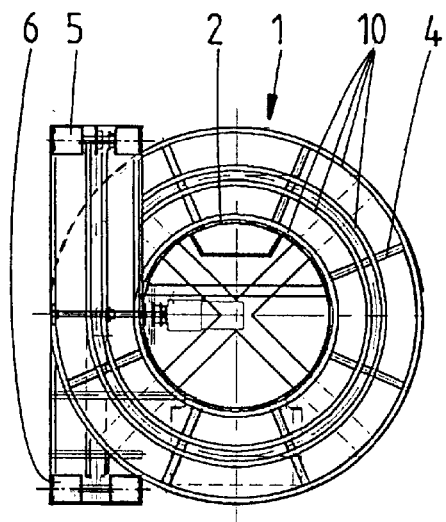
FIG. 2 is a plan-view of the frame of the conveyor of FIG. 1.
Figure 1:
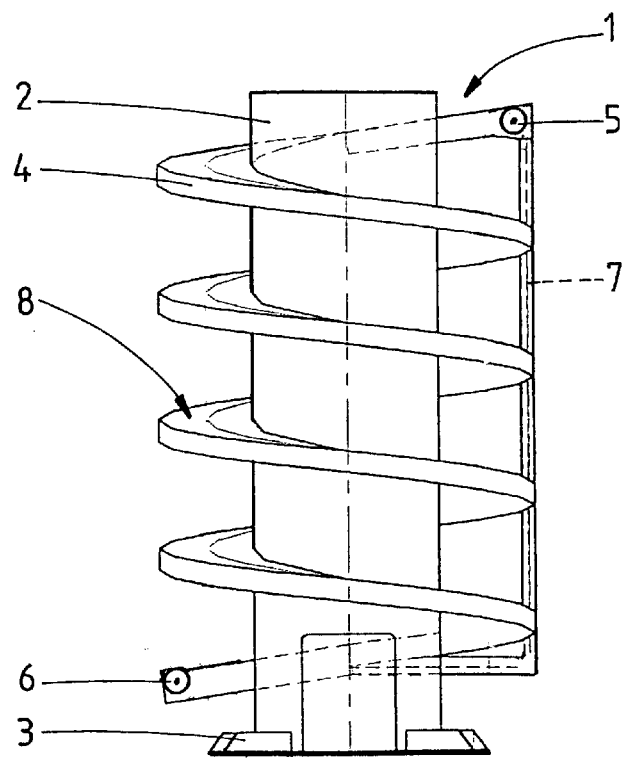
FIG. 1 is a very schematic and general side-view of an embodiment of a conveyor according to the invention.

The drawing shows a conveyor adapted to convey articles, in particular piece goods, through a helical path in the vertical direction. In practice such conveyors are known as spiral conveyors or winding conveyors. This conveyors are able to transport articles in a continuous flow. This product flow may be intended for vertical transport or for buffering in a process section. Areas of utilization are for example the food processing industry, distribution centers, the graphics industry and the like.

The conveyor as shown comprises a frame 1, in this case including a central column 2 having feet 3 and a helical guide chute 4 extending around the column 2 and fixed thereto. Of course various kinds of other frame structures are also conceivable. An end pulley 5, 6 is provided at the upper and lower ends of the guide chute 4, and between these ends of the helical guide chute 4 extends a return chute 7 of the frame 1. In this case a conveyor belt 8, which is supported by the frame 1, is guided through another path in the conveying part and the return part. However, embodiments are conceivable in which the conveying part is guided back at the lower side of the guide chute 4.

In the case as shown, the helical guide chute 4 includes four windings, but this number may be increased or decreased depending on the particular case. Due to the invention it is now possible to drive the conveyor belt 8 through a great number of windings without any drive problems. In the embodiment shown the drive motor may engage the end pulley at the end of the path of the conveyor, that is the end pulley 5 or 6, and if desired it is possible to use also auxiliary drives at other positions in the transport path. A linear drive for the conveyor belt 8 is also conceivable. The conveyor may join to other conveyors at the upper and lower end pulleys 5, 6.

Figure 3:
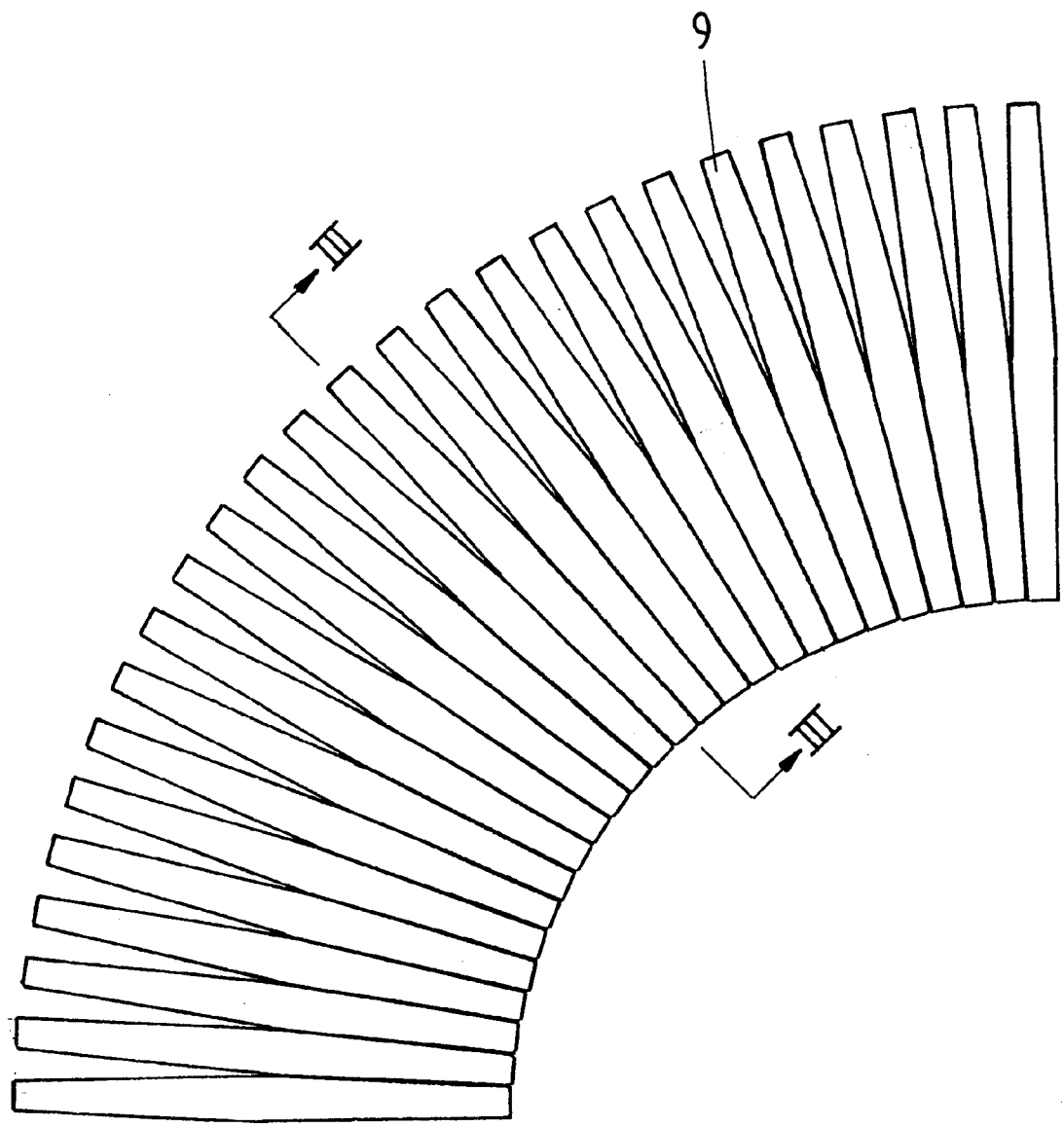
FIG. 3 is a larger-scale plan-view of the slats of a small portion of the conveyor belt of the conveyor of FIG. 1 and 2 in the helical path.

With reference to FIG. 3, the conveyor belt 8 comprises a plurality of slats 9 coupled to each other, either directly or through an endless connecting member. Each slat 9 has an upper flat transport face and the slats are joined to each other so closely in the transport path that articles may be supported by a number of adjacent slats 9. As mentioned before, the slats 9 are pivotally interconnected directly or in this case through an endless connecting member to be described hereafter, such that the slats 9 are relatively pivotable both around a first axis parallel to their transport face and perpendicularly to the direction of conveyance, and around a second axis perpendicularly to the transport face and perpendicularly to the direction of conveyance. This latter pivotal movement allows the formation of the spiral path, whereas the first mentioned pivotal movement enables the bending of the conveyor belt 8 around the end pulleys 5 and 6. Since the slats 9 are slightly tapered from their central axis to the ends, the slats 9 do not interfere in curves. Other configurations, such as a rhomb shape, V-shape, and fork shape and also overlapping configurations or a combination thereof, are conceivable. In a particular case the slats 9 may be segment-shaped, but in this case the conveyor belt may only run through a completely curved path, but then there is created a completely closed surface of the conveyor belt 8.

Figure 4:
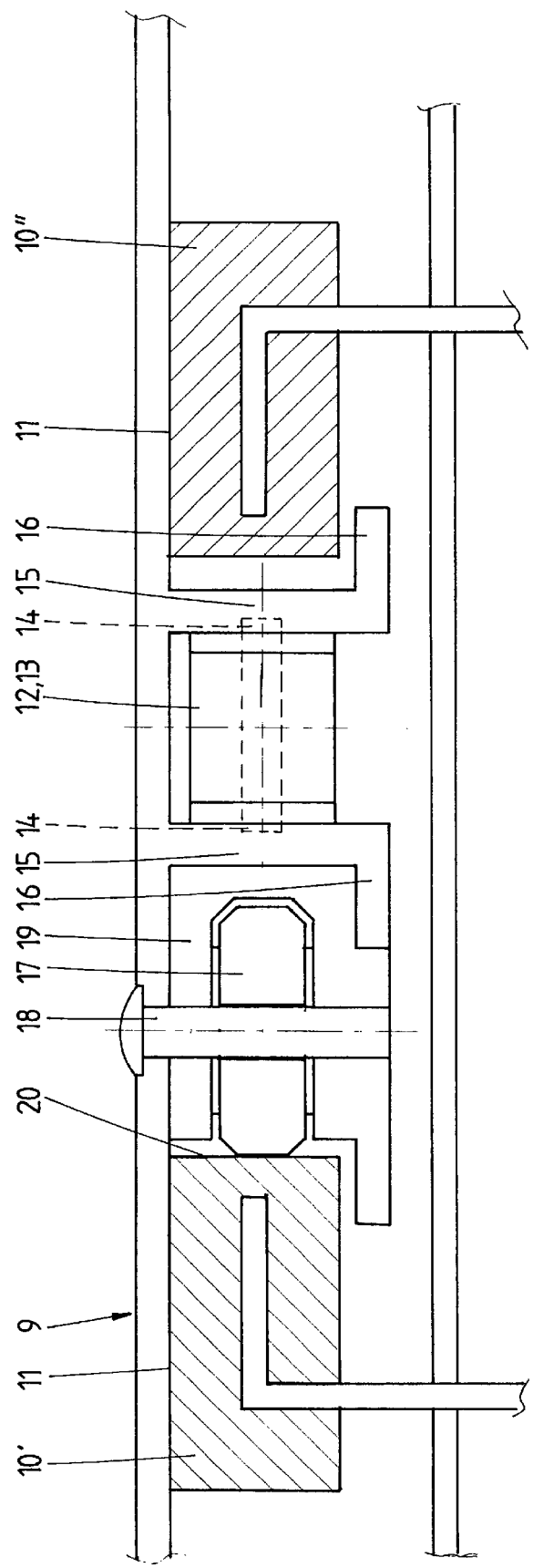
FIG. 4 is a larger-scale sectional view along the IV—IV in FIG. 3.

With reference to FIGS. 2 and 4, the guide chute 4 of the frame 1 includes helical sections 10 (10',10") having an upper support face 11 on which the slats 9 rest with their lower side so that the slats 9 are slidingly supported by the support face 11 when they move. By a proper selection of the materials of the sections 10 and the (plastic) slats it is possible to keep the friction and wear at a low level.

FIG. 4 also shows that the slats 9 are interconnected by a chain 12, preferably a steel chain, for example a so-called "side-bow" chain or space chain allowing a bending into directions and allowing torsion so that the chain 12 may run through the helical path. In a known manner the main links 13 of the chain 12 are provided with extended pins 14 snapped into holes of vertical flanges 15 of the slats 9 on either side of the chain 12. Preferably, each main link is attached to a slat 9 so that it is impossible for the chain 12 to sag between adjacent slats 9 and this allows for a small radius of the helical path without overloading the chain. The vertical flanges 15 at the lower side of each slat 9 comprise at the lower side outwardly pointing, horizontal feet 16 which may be used to engage under the sections 10 to prevent the slats 9 from moving upwardly away from their support faces 11.

FIG. 4 further shows that there is arranged a guide roller 17, in this case inwardly of the central axis of the shown slat 9 and consequently inwardly of the inner flange 15 (as seen in relation to the helical path). The guide roller 17 is rotatable around a rotary shaft 18 extending parallel to the second axis, perpendicularly to the transport face of the slat, and perpendicularly to the direction of conveyance. The guide roller 17 is journalled on the rotary shaft, preferably by means of a rolling bearing to obtain smooth running of the guide roller 17. The rotary shaft 18 of the guide roller 17 extends through a reinforcing member 19 having a tilted substantially U-like shape, whereas the rotary shaft may also serve as fixing means to fix the rotary shaft 18 and guide roller 17 to the slat 9 as shown in FIG. 4. Of course various other manners of fixation are conceivable.

The guide roller 17 co-operates with the radially outwardly turned guide face 20 of the inward guide section 10' so that the conveyor belt is guided by a rolling support in the radial direction. The guide roller 17 preferably has a cylindrical running surface co-operating with the smooth and vertical guide face 20 so that no forces are created in vertical direction. The reinforcing member 19 is provided with a horizontal foot 21 taking over the function of the foot 16 of the vertical flange 15 since the foot 16 of the inward vertical flange 15 is now used for confining the reinforcing member 19.

The embodiment shown has the advantage that a standard slat is utilized and, with respect to a conveyor without guide rollers 17, is only necessary to displace the inward section 10 inwardly to be able to support a conveyor belt 8 having guide rollers 17.

The guide rollers 17 may be provided on all slats 9, but it is also possible to equip only a limited number of slats with the guide roller 17. Furthermore it is possible to provide two guide rollers on a slat, for example if the conveyor belt should run through both left and right curves.

Figure 5:
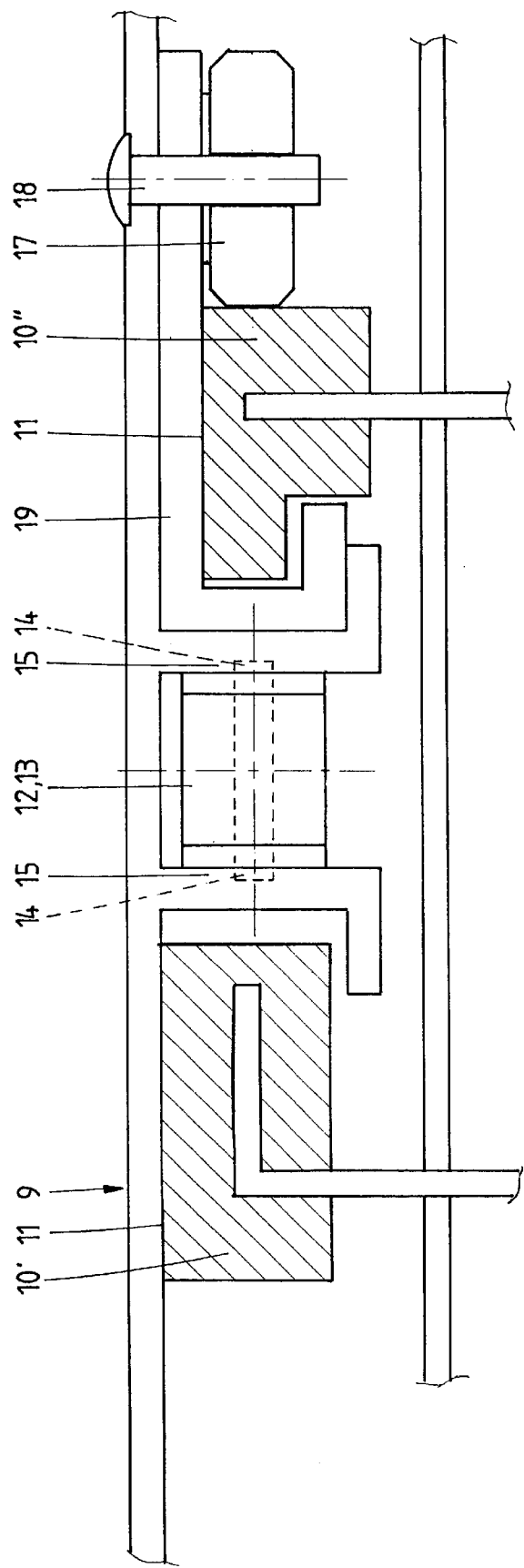
FIG. 5 is a sectional view corresponding to that of FIG. 4 and showing a modified embodiment.

FIG. 5 shows a modified embodiment in which the guide roller 17 is positioned outwardly of the central axis of the respective slat, as seen in relation to the spiral-shaped path. The reinforcing member is now positioned between the support face 11 of the outer section 10" and the lower side of the slat 9 so that the reinforcing member 19 now also serves for guiding the slat on the support face 11. The section 10" is now shaped in a different way also because the reinforcing member 19' should also prevent movements in vertical direction. This embodiment has the advantage of a more stable guidance of the slats 9 since the guide roller 17 is positioned outwardly of the point of engagement of the chain 12.

From the foregoing it will be clear that, by making use of simple and reliable means, the invention allows for driving a conveyor belt, which is guided through a helical path, through a great number of windings, without drive problems and without affecting the structure of the slats. It is not necessary to tension the belt.

The invention is not restricted to the embodiments shown in the drawing and described herein before by way of example, which may be varied in different manners within the scope of invention. For example, the slats may also be interconnected directly in a pivotable manner near their central axis by special connecting parts. A separate chain or the like is then rendered superfluous.

I claim:

1. A conveyor for conveying piece goods through a helical path in a vertical direction, comprising:
   a frame comprising a helical support face forming the helical path;
   an endless conveyor belt supported by said frame, said endless conveyor belt having a conveying part supported by said helical support face along the helical path, a return part extending along a return path, and a conveying direction defined by said helical support face;

said endless conveyor belt including a plurality of substantially rigid slats each having an upper transport face, a first axis parallel to said transport face and perpendicular to the conveying direction and a second axis perpendicular to said transport face and perpendicular to the conveying direction, wherein said slats are each movably coupled near said first axis thereof and relatively pivotable around both said first axis and second axis;

a drive for driving said endless conveyor belt along said helical support face;

a radially directed guide surface on said frame for substantially radially guiding said slats of said endless conveyor belt located along said conveying part of said endless conveyor belt;

a part each of on said slats on an outer side of said second axes of said slats remote from said guide surface that engages under said frame for preventing said slats from moving upwardly; and a guide roller provided with at least some of said slats, said guide roller being rotatable about an axis of rotation that is parallel to said second axis and being adapted to roll along said radially directed guide surface of said frame.

2. The conveyor of claim 1, wherein said axis of rotation of said guide roller is positioned radially outwardly of said second axis of said slats with respect to said frame.

3. The conveyor of claim 1, wherein said axis of rotation of said guide roller is positioned radially inwardly of said second axis of said slats with respect to said frame.

4. The conveyor of claim 1, wherein each of said at least some of said slats comprises a reinforcing member located at the position of said guide roller thereof.

5. The conveyor of claim 4, wherein each said reinforcing member comprises one of said parts on said slats on either side of said second axes of said slats that engage under said frame for preventing said slats from moving upwardly.

6. The conveyor of claim 1, wherein said slats are interconnected by a roller chain comprising links attached to respective said slats at said first axis thereof.

7. The conveyor of claim 6, wherein;

each of said at least some of said slats comprises a reinforcing member located at the position of said guide roller thereof; and said links of said chain comprise main links, each of said main links being snapped-in between vertical flanges on one of said slats on either side of said chain, and said flanges comprising horizontal feet which at least in part confine said reinforcing member.

8. The conveyor of claim 1, wherein said slats are segment shaped, conically configured pulleys are located at ends of said helical path, and said return path extends along and corresponds to said helical path.

* * * * *